Dec. 25, 1962 E. BLOCH ET AL 3,070,706

MAGNETIC LOGICAL CIRCUITS

Filed Jan. 23, 1958 2 Sheets-Sheet 1

INVENTORS
ERICH BLOCH
ROBERT C. PAULSEN
BY
William V Schelberg
AGENT

Dec. 25, 1962 E. BLOCH ET AL 3,070,706

MAGNETIC LOGICAL CIRCUITS

Filed Jan. 23, 1958 2 Sheets-Sheet 2

3,070,706
MAGNETIC LOGICAL CIRCUITS

Erich Bloch, Poughkeepsie, N.Y., and Robert C. Paulsen, Boonton, N.J., assignors to International Business Machines Corporation, New York, N.Y., a corporation of New York Filed Jan. 23, 1958, Ser. No. 710,644
5 Claims. (Cl. 307—88)

This invention relates to switching circuits and more particularly to magnetic core binary switching circuits for performing the functions of NOT AND and AND which do not require the use of diodes.

Various logical components which avoid the need for diodes in coupling magnetic components have been devised as described and claimed in a copending application Serial No. 528,594, filed August 16, 1955, now issued as Patent Number 2,907,987, and in another copending application Serial No. 629,631, filed December 20, 1956, now issued as Patent Number 2,894,151, each in behalf of Louis A. Russell, with which these circuits are adapted to operate. Both of the above patents are assigned to the same assignee as the present application.

In many instances, devices capable of performing the more complex logical operations to enable greater control in data processing equipment is desirable and a novel means by which such devices may be constructed in magnetic core switching circuits is by utilization of the so called "inhibit" core which, as heretofore employed, provides an inhibiting signal to input variables when set and provides a signal source upon reset, as is described and claimed in the copending application Serial Number 689,827, filed October 14, 1957, now abandoned, but continued by continuation application Serial No. 136,971, filed August 29, 1961, on behalf of John A. Kauffmann and assigned to the same assignee as the present application.

The use of the inhibit core as described in the aforementioned application is generally confined to magnetic circuitry in which the number of input coupling cores is equal to or no more than one greater than the number of inhibit cores and wherein the logical operator desired provides an output in the absence of inputs. Since the inhibit core provides a signal when set and reset, the prime use of the inhibit core is to provide a signal source in the absence of signal input, when reset, and cancelling a predetermined signal input, when set. The use of the inhibit core in devices designed to perform logical operators such as AND, require a greater number of cores to provide the desired cancelling effect and a signal to a storage means, which is indicative of the presence of the desired signal input. As the number of input variables to such a device is increased, the number of magnetic elements required to provide the desired operator is, of necessity, increased. In accordance with the present invention, complex logical operations, particularly AND and NOT AND, are accomplished with a lesser number of magnetic cores than heretofore feasible with switching circuitry that does not employ diode elements.

Accordingly, it is a fundamental object of this invention to provide a new and improved control in switching circuits.

Another object of this invention is to provide a new and improved NOT AND circuit employing magnetic cores, wherein the conventionally used diode element is not required.

Still another object of this invention is to provide a new and improved AND circuit employing magnetic cores wherein diodes are not required.

A more specific object of the invention is to provide magnetic core logical switching circuits which do not require use of diode elements and in which a lesser number of inhibit cores are employed than heretofore required.

Other objects of this invention will be pointed out in the following description and claims and illustrated in the accompanying drawings, which disclose, by way of example, the principle of the invention and the best mode, which has been contemplated, of applying that principle.

The foregoing objects are realized when constructing the control, as contemplated in the present invention, for the three input NOT AND circuit and the three input AND circuit as herein disclosed. In this respect a NOT AND circuit may be defined as a circuit having a plurality of input terminals and a single output terminal at which a signal is delivered in every cycle of operation except when all of the possible input terminals are coincidently energized, while an AND circuit may be defined as a circuit having a plurality of input terminals and a single output terminal at which a signal is delivered only when all of the input terminals are coincidently energized. In each of the embodiments disclosed, three input coupling cores, an inhibit core, and a storage core is provided. Each of the input coupling cores have an input winding which is energized by a separate input variable and is adapted to switch the core linked from a first to a second state of magnetization. Each of the input coupling cores is further provided with an output winding which windings are serially connected. The inhibit core is also provided with an output winding while the storage core is provided with a control winding which serves as an output and an input winding. The output winding on the inhibit core is serially connected with the control winding on the storage core which in turn is further connected with the output windings on the input coupling cores serially opposed. The storage core is further provided with an inhibiting bias at all times which tends to prevent information storage. The inhibit core is set and reset in every cycle of information and provides further inhibition of the transfer of information into the storage core. To overcome the inhibiting bias applied to the storage core and the opposing induced voltage set up by the inhibit core, at least three input variables must be simultaneously introduced to transfer information into the storage core. Depending upon the field thereafter applied to the storage core, that is, to utilize the times when information is not transferred into the storage core and the condition necessary to transfer information into the storage core, the two different functions of AND and NOT AND may be realized.

Figure 1:
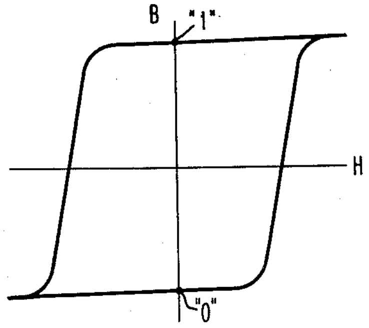
FIG. 1 is a representation of the hysteresis characteristic obtained for a magnetic material of the type employed.

Referring to FIG. 1, the curve illustrated comprises a plot of flux density (B) versus applied field (H) for a magnetic core having a substantially rectangular hysteresis characteristic. The opposite remanence states are conventionally employed for representing binary information conditions and are arbitrarily designated as "0" and "1." With a "0" stored, a pulse applied to a winding linking the core in proper sense causes the loop to be traversed and the remanence state "1" is attained when the pulse terminates. Such a pulse is hereinafter referred to as a "write" pulse. Similarly, the core is read out or returned to the "0" state, in determining what information has been stored, by applying a pulse in reverse sense to the same or another winding, hereinafter referred to as a "read" pulse. Should a "1" have been stored, a large flux change occurs with the shift from "1" to "0" with a corresponding voltage of relatively large magnitude developed in an output winding. On the other hand, should a "0" have been stored, little flux change occurs and negligible signal is developed in the output winding.

Figure 2:
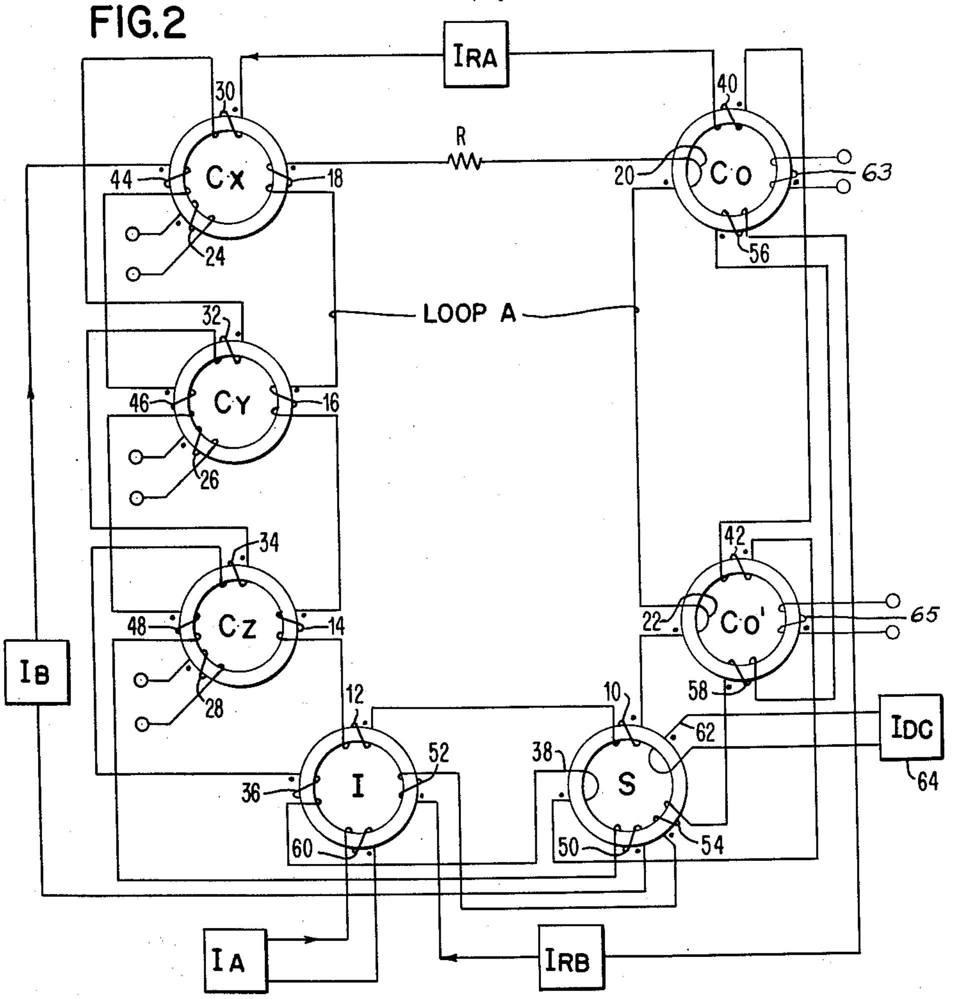
FIG. 2 is a circuit diagram of a magnetic core NOT AND circuit according to one embodiment of this invention.
Figure 3:
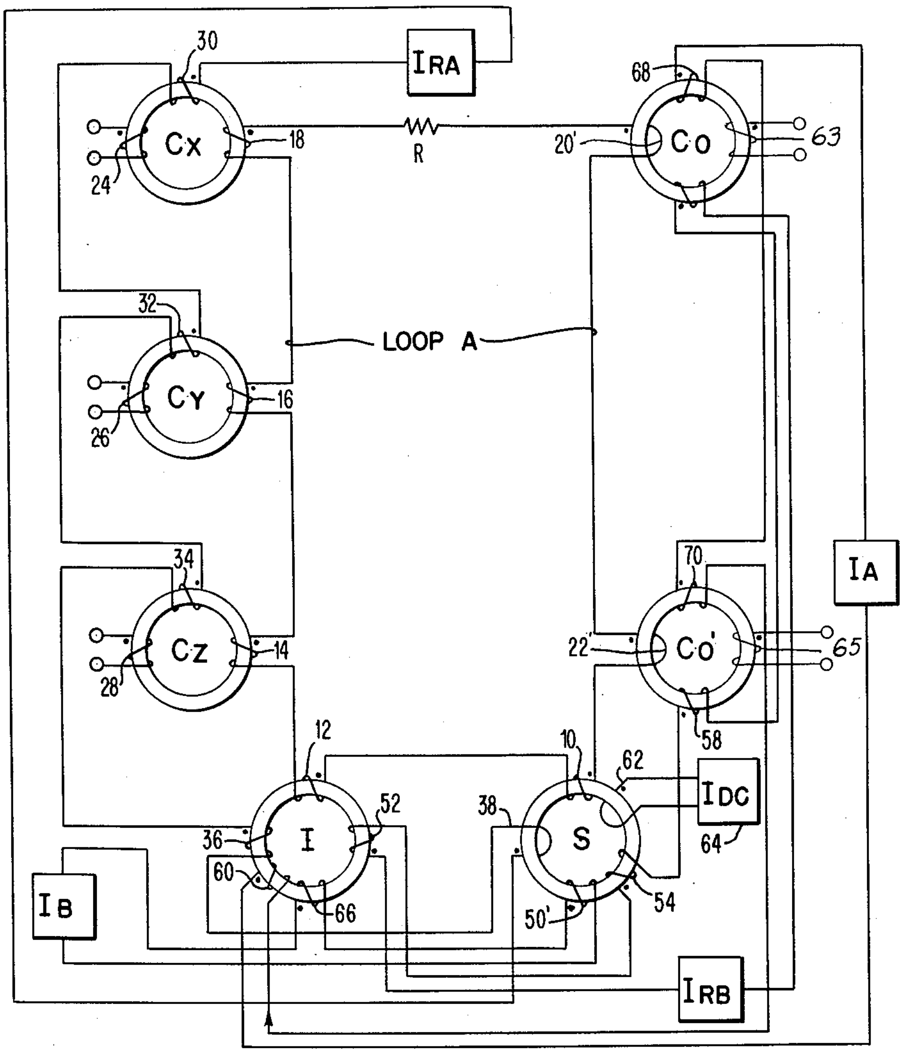
FIG. 3 is a circuit diagram of a magnetic core AND circuit according to a further embodiment of this invention.

A dot is shown adjacent one terminal of each of the windings illustrated in FIG. 2 and FIG. 3 indicating its winding direction. A write pulse is a positive pulse which is directed into the undotted end of the winding terminal which tends to store a "1," while a read pulse is a positive pulse directed into the dotted end of the winding terminal and tends to apply a negative field or store a "0."

The circuit arrangement disclosed herein employs input and output coupling magnetic cores and an inhibit core arranged intermediate to so called "storage magnetic cores" which store logical information and these arrangements are adapted to be interconnected with each other and similar type circuitry through such coupling cores. As previously described, the inhibit core is a coupling core which is set and reset in every cycle of operation and is adapted to inhibit voltages applied to the circuit by information inputs.

The coupling cores and inhibit core may be fabricated of ferrite materials of the same type used for the storage cores, however, it is not essential that these cores exhibit the rectangular hysteresis characteristic required of the storage or memory core as these devices function as variable impedance elements in controlling the transfer of information pulses, however, they should have a relatively good $Br/Bs$ ratio, as will be more evident from the following description. Such interconnecting coupling cores and inhibit core are illustrated in the subsequently described and depicted circuit which are labeled $Cx$, $Cy$, $Cz$, $Co$, $Co'$ and I for clarity.

Referring again to the FIG. 2, the core S is provided with a winding 10 interconnected with an output winding 12 on the core I, an output winding 14 on the core $Cz$, and output winding 16 on the core $Cy$, and output winding 18 on the core $Cx$, and input winding 20 on the core $Co$ through a resistor R, and an input winding 22 on the core $Co'$, which interconnection is hereinafter referred to as loop A.

The storage core S is adapted to receive information pulses transferred to it through the coupling cores $Cy$, $Cx$ and $Cz$ in conjunction with the core I. This information, in turn, is transferred from the core S through the coupling cores $Co$ and $Co'$ to further similar devices with which this circuit is adapted to operate. Information thus transferred is representative of the function "NOT AND." Input signals are applied to the core $Cx$ by means of an input winding 24, and similarly input signals are applied to the cores $Cy$ and $Cz$ by means of an input winding 26 and an input winding 28 on the cores $Cy$ and $Cz$, respectively. The core I is energized from a clock pulse source $I_A$ while the cores $Cx$, $Cy$, $Cz$, I, S, $Co$ and $Co'$ are energized from a clock pulse source $I_{RA}$. The cores $Cx$, $Cy$, $Cz$ along with the core S are further energized from a clock pulse source $I_B$, while the cores S, I, $Co$ and $Co'$ are energized from a clock pulse source $I_{RB}$. The core S is further energized by a continuous direct current source $I_{d.c.}$. A winding 30 is provided on the core $Cx$, a winding 32 on the core $Cy$, a winding 34 on the core $Cz$, a winding 36 on the core I, a winding 38 on the core S, a winding 40 on the core $Co$ and a winding 42 on the core $Co'$ which windings are series connected with the source $I_{RA}$. A winding 44 is provided on the core $Cx$, a winding 46 on the core $Cy$, a winding 48 on the core $Cz$ and a winding 50 on the core S which windings are series connected with the source $I_B$. A winding 52 is provided on the core I, a winding 54 on the core S, a winding 56 on the core $Co$ and a winding 58 on the core $Co'$, which windings are series connected with the clock pulse source $I_{RB}$, while a winding 60 is provided on the core I which is connected with the clock pulse source $I_A$. A further winding 62 is provided on the core S which is connected with a direct current source 64. Outputs are derived from the circuit by means of an output winding 63 on the core $Co$ and an output winding 65 on the core $Co'$.

Figure 4:
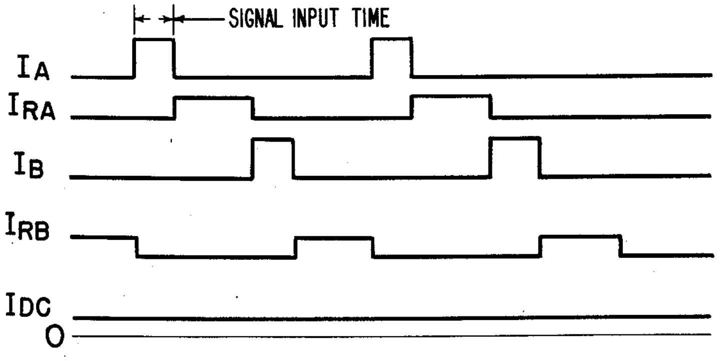
FIG. 4 illustrates the relative timing of current pulses which are required for operating the circuits of FIG. 2 and FIG. 3.

The sequence of pulses provided by the several clock pulse sources described above is indicated in the FIG. 4, and it is observed that the time of appearance of an input pulse occurs at the time the $I_A$ clock pulse appears.

Referring to the FIG. 2, consider as an initial condition that all cores shown are at the lower remanence condition "0" shown in the FIG. 1. Assume, in the first cycle of operation, an input pulse is applied to any one of the input windings 24, 26 or 28 on the cores $Cx$, $Cy$ or $Cz$, respectively. The core associated with the energized input winding will switch from the "0" toward the "1" state and in so doing will induce a voltage in its associated output winding 18, 16 or 14, respectively, with the undotted end positive. Coincidently, the $I_A$ clock pulse source directs a write signal into the winding 60 on the core I which switches the core I from the "0" toward the "1" state to induce a voltage in the output winding 12 with the undotted end positive. The algebraic sum of the induced voltages in the winding 12 on the core I and in the particular output winding 18, 16 or 14 on the cores $Cx$, $Cy$ or $Cz$, respectively, which was switched to the "1" state at this time, is effectively zero and negligible current flows in the loop A. After the $I_A$ clock pulse subsides, the $I_{RA}$ clock pulse directs a signal into the windings 30, 32, 34, 36, 38, 40 and 42 on the cores $Cx$, $Cy$, $Cz$, I S, $Co$ and $Co'$, respectively, which signal tends to read the cores $Cx$, $Cy$, $Cz$, I, $Co$ and $Co'$ and pulse biases the core S toward the write "1" threshold. The core I switches from the "1" toward the "0" state and in so doing induces a voltage in the output winding 12 with the dotted end positive. Coincidentally, the particular input coupling core $Cx$, $Cy$, or $Cz$ which was left in the "1" state is now reset from the "1" toward the "0" state and in so doing induces a voltage in the output winding 18, 16 or 14, respectively, with the dotted end positive. The algebraic sum of these induced voltages is again effectively zero, and negligible current flows in the loop A. After termination of the $I_{RA}$ clock pulse, the $I_B$ clock pulse source directs a signal into the windings 44, 46, 48 and 50 on the cores $Cx$, $Cy$, $Cz$ and S, respectively, which signal tends to read the cores $Cx$, $Cy$ and $Cz$ and write the core S. Since the cores $Cx$, $Cy$ and $Cz$ are already in the "0" state, they are uneffected while the core S is switched from the "0" toward the "1" state. The core S in switching toward the "1" state induces a voltage in the winding 10 with the undotted end positive causing a clockwise current in the loop A which tends to write each of the cores $Cz$, $Cy$, $Cx$, $Co$ and $Co'$ while tending to read the core I. Since the core I is already in the "0" state and the cores $Cx$, $Cy$ and $Cz$ are held in "0" state by the $I_B$ drive in their windings 44, 46 and 48, respectively, the cores $Co$ and $Co'$ are switched from the "0" to the "1" state. The cores $Co$ and $Co'$ in switching induce a voltage on their respective output windings 63 and 65 to provide an output indication to further logical circuitry which may be connected with the aforesaid output windings. Subsequently, the $I_{RB}$ clock pulse source directs a read signal into the windings 52, 54, 56 and 58 on the cores I, S, $Co$ and $Co'$, respectively, which switches the cores $Co$, $Co'$ and S from the "1" toward the "0" state. The cores $Co$, $Co'$ and S in switching induce a voltage in the windings 10, 20 and 22 with the undotted end positive. The induced voltage in the windings 20 and 22 is in opposition with this induced voltage in the winding 10, the algebraic sum of which is effectively zero due to the large number of turns in the winding 10 as compared with the number of turns in the windings 20 and 22, and negligible current flows in the loop A. Thus, whenever any one of the input variables is introduced, an output is provided and the cores are left in the "0" state readying the circuit for the next cycle of operation.

In the next cycle of operation, assume any two of the input variables are introduced, say to the windings 24 and 26 on the cores *Cx* and *Cy*. The cores *Cx* and *Cy* are then switched from the "0" towards the "1" state and in so doing induce a voltage in their output windings 18 and 16, respectively, with their undotted end positive. Coincidently, the $I_A$ clock pulse source directs a write signal into the winding 60 on the core I, which switches the core I from the "0" towards the "1" state to induce a voltage in the winding 12 with its undotted end positive. The algebraic sum of the induced voltages in the windings 18, 16 and 12 is such as to provide a counter-clockwise current in loop A which tends to write the core S and read the cores *Co* and *Co'*. The direct current source 64 applies a constant current into the winding 62 on the core S which provides a negative bias on the core S, biasing the core S toward the "0" state at all times. Consequently, because the current in the loop A is approximately due to the volt-time product of one core switching, it is insufficient to overcome the bias on the core S. Thus, since the cores *Co* and *Co'* are already in the "0" state and the core S is biased towards the "0" state, the current energy is dissipated in the resistor R. Upon termination of the inputs and the $I_A$ clock pulse, the $I_{RA}$ clock pulse source directs a signal into the windings 30, 32, 34, 36, 38, 40 and 42 on the cores *Cx*, *Cy*, *Cz*, I, S, *Co* and *Co'*, respectively, which signal tends to read each of the cores *Cx*, *Cy* *Cz*, I, *Co* and *Co'*, and biases the core S to the write "1" threshold. The cores *Cx*, *Cy* and I are switched from the "1" towards the "0" state and in so doing induce a voltage in their output windings 18, 16 and 12, respectively, with their dotted end positive. The algebraic sum of the induced voltage is such as to cause a clockwise current in loop A which tends to write the cores *Co*, *Co'* and *Cz* while tending to read the core S. This current has no effect since each of the cores *Cz*, *Co* and *Co'* are held in the "0" state by virtue of the $I_{RA}$ drive in their windings 34, 40 and 42, respectively, while the core S is pulse biased toward the "1" state by virtue of the $I_{RA}$ drive in the winding 38. Consequently, the current energy is dissipated in the resistor R. Thereafter, the $I_B$ clock pulse source directs a signal into the windings 44, 46, 48 and 50 on the cores *Cx*, *Cy*, *Cz* and S, respectively, which signal tends to read each of the cores *Cx*, *Cy*, and *Cz* and tends to write the core S. The core S is switched from the "0" toward the "1" state and in so doing induces a voltage in the winding 10 with the undotted end positive causing a clockwise current in loop A. This current in loop A tends to write the cores *Cx*, *Cy*, *Cz*, *Co* and *Co'* while tending to read the core I. Since the core I is already in the "0" state, and the cores *Cz*, *Cy* and *Cx* are held in the "0" state by virtue of the $I_B$ drive, the cores *Co* and *Co'* are switched from the "0" towards the "1" state. The cores *Co* and *Co'*, in switching, induce a voltage on their output windings 63 and 65 respectively, to again provide an output signal to further logical circuitry connected to the aforesaid output windings. Subsequently, the $I_{RB}$ clock pulse source directs a signal into the winding 52, 54, 56 and 58 which tends to read each of the cores, I, S, *Co* and *Co'*, respectively. The cores S, *Co* and *Co'* are reset from the "1" toward the "0" state and in so doing induce a voltage in the windings 10, 20 and 22, with their dotted end positive. The algebraic sum of the induced voltages is effectively zero and negligible current flows in the loop A. Thus, whenever any two of the possible three input variables are introduced, an output is obtained and all the cores are left in the "0" state readying the circuit for the next cycle of operation.

In the next cycle of operation, assume all inputs are available to the circuit. Each of the input windings 24, 26 and 28 are energized on the cores *Cx*, *Cy* and *Cz*, respectively, which switch the cores from the "0" toward the "1" state and in switching, induce a voltage in their output windings 18, 16 and 14, respectively, with the undotted end positive. Coincidently, the $I_A$ clock pulse source directs a write signal into the winding 60 on the core I which switches the core I from the "0" towards the "1" state to induce a voltage in the output winding 12 with the undotted end positive. The algebraic sum of the induced voltages is such as to cause a counter-clockwise current in loop A. This current in loop A tends to write the core S and read the cores *Co* and *Co'*. Since the cores *Co* and *Co'* are already in the "0" state, they are uneffected, however, since we now have available the effective volt-time produce of two cores switching, the constant direct current bias 64 as applied to the winding 62 on the core S is overcome and the core S is switched from the "0" to the "1" state. Thereafter, the $I_{RA}$ clock pulse source directs a signal into the windings 20, 32, 34, 36, 38, 40 and 42 on the cores *Cx*, *Cy*, *Cz*, I, S, *Co* and *Co'*, respectively, which signal tends to read the cores *Cx*, *Cy*, *Cz*, I, *Co* and *Co'* and pulse biases the core S toward the write "1" threshold. The cores *Cx*, *Cy*, *Cz* and I are reset from the "1" toward the "0" state, and in so doing induce a voltage on their output windings 18, 16, 14 and 12, respectively, with their dotted end positive. The algebraic sum of the induced voltages is such as to cause a clockwise current in loop A which tends to write the cores *Co* and *Co'* while tending to read the core S. The cores *Co* and *Co'* are held in the "0" state by virtue of the $I_{RA}$ drive, while the core S is held in the "1" state by virtue of the write bias applied at this time. The current energy is then dissipated in the resistor R. After termination of the $I_{RA}$ clock pulse, the $I_B$ clock pulse source directs a signal into the windings 44, 46, 48 and 50 on the cores *Cx*, *Cy*, *Cz* and S, respectively, which signal tends to read the cores *Cx*, *Cy* and *Cz* while tending to write the core S. Since the core *Cx*, *Cy* and *Cz* are already in the "0" state while the core S is already in the "1" state, negligible change takes place. Subsequently, the $I_{RB}$ clock pulse source directs a read signal into the windings 52, 54, 56 and 58 on the cores, I, S, *Co* and *Co'*, respectively which switches the cores from the "1" toward the "0" state. The core S in switching induces a voltage in its control winding 10 with the dotted end positive causing a counter-clockwise current in loop A which tends to read each of the cores *Co'*, *Co*, *Cx*, *Cy* and *Cz* while tending to write the core I. Since the cores *Co'*, *Co*, *Cx*, *Cy* and *Cz* are already in the "0" state, while the core I is held in the "0" state by the $I_{RB}$ drive in the winding 52, the current energy is dissipated on the resistor R. Thus, with all three input variables introduced, there is no output indication and all cores are left in the "0" state.

Assume, in the next cycle of operation, an absence of inputs to the circuit. The $I_A$ clock pulse source directs a write signal into the winding 60 on the core I which switches the core I from the "0" toward the "1" state. The core I in switching induces a voltage in the output winding 12 with the undotted end positive, causing a clockwise current in loop A which tends to write each of the cores *Cz*, *Cy*, *Cz*, *Co* and *Co'*, while tending to read the core S. Since the core S is already in the "0" state, while the number of turns in the output windings 14, 16 and 18 on the cores *Cz*, *Cy* and *Cx*, respectively, are equal and have a relatively large number of turns when compared with the number of turns in the windings 20 and 22 on the cores *Co* and *Co'*, respectively, each of the cores *Cz*, *Cy* and *Cx* are partially switched towards the "1" state. After the $I_A$ clock pulse subsides the $I_{RA}$ clock pulse source directs a signal into the windings 30, 32, 34, 36, 38, 40 and 42 on the cores *Cx*, *Cy*, *Cz*, I, S, *Co* and *Co'*, respectively, which signal tends to read the cores *Cx*, *Cy*, *Cz*, I, *Co* and *Co'* and biases the core S towards the "1" threshold. The cores *Cx*, *Cy*, *Cz* and I are reset to the "0" state and the core I in switching from the "1" toward the "0" state induces a voltage in the output winding 12 with the dotted end positive, while the cores Cx, Cy and Cx are being reset from their partial write condition to the "0" state induce a voltage in the output winding 18, 16 and 14, respectively, with their dotted end positive. The algebraic sum of the induced voltages is effectively zero and negligible current flows in the loop A. At the termination of the $I_{RA}$ clock pulse all cores are left in the "0" state and the circuit is seen to be in the same condition as in the previous cases, as described above, when only one, or only two, of the possible three input variables were present, namely, the core S is left in the "0" state. Thus, further operation of the $I_B$ and $I_{RB}$ clock pulse sources provide pulses which set the core S to the "1" state to provide an output indication by switching the cores Co and Co' to the "1" state and thereafter the cores S, Co and Co' are reset to the "0" state. Thus an output is provided in the absence of a signal input and all cores are left in the "0" state. The function of NOT AND has thus been accomplished as described above.

In the embodiment for forming the function of NOT AND, as described above, the core S is switched to the "1" state during operation of the $I_B$ clock pulse source to provide a signal output provided the core has previously been left in the "0" state. In only one instance has the core S previously been left in the "1" state, and this occurred, in particular, when all input variables were introduced. Utilizing this particular condition, and providing means for switching the core S to the "0" state instead of the "1" state by the $I_B$ clock pulse source, an output signal is then produced which is indicative of the function of AND. To provide the aforementioned means, referring to the embodiment shown in FIG. 3, a winding which corresponds to the winding 50 on the core S in the FIG. 2, is provided, which is of opposite polarity sense and is designated with a prime to indicate this change (50'). Energization of the winding 50' will then provide little change to core S, if left, previously, in the "0" state and will provide a counter-clockwise current in loop A if the core S is left previously in the "1" state. The counter-clockwise current which is provided at this time must switch the cores Co and Co' to provide an output indication to further similar circuitry which may be inductively linked with these cores. Thus, similar to the input windings 20 and 22 on the cores Co and Co', respectively, in the FIGURE 2, the windings 20' and 22' are provided which are wound on the cores Co and Co' in opposite polarity sence in the FIG. 3. The counter-clockwise current provided by switching the core S from the "1" to the "0" state would also tend to write the core I and accordingly, a further winding 66 is provided on the core I interconnected with the winding 50' and the $I_B$ clock pulse source. It is also observed that this counter-clockwise current is in such a direction as to read the cores Cx, Cy, and Cz, which cores are previously left in the "0" state. Therefore, the hold windings 44, 46 and 48 in the FIG. 2, on the cores Cx, Cy and Cz, respectively, are not needed and accordingly are eliminated in the FIG. 3. Further, since operation of the AND circuit is substantially as described for the NOT AND circuit during operation of the $I_A$ and $I_{RA}$ clock pulses, in the particular instances in which two or three of the possible input variables are introduced during operation of the $I_A$ clock pulse source, a counter-clockwise current flows in the loop A which tends to write the core S, but this effect is opposed by the bias applied. This current flow also tends to write the cores Co and Co' and switching the cores Co and Co' at this time is undesirable. Accordingly, a hold winding 68 is provided on the core Co and similarly, a hold winding 70 is provided on the core Co', which windings are connected with the $I_A$ clock pulse source. Upon operation of the $I_{RA}$ clock pulse source, in the particular instances as recited above, a clockwise current flows in loop A which now tends to read each of the cores Co, Co' and S. The core S, as before, will be biased toward the write "1" threshold to prevent switching to the "0" state when previously left in the "1" state, while the cores Co and Co' will always be in the "0" state at this time. The hold windings 40 and 42 in the FIG. 2, on the cores Co and Co', respectively, are then not needed and accordingly are eliminated in FIG. 3. The necessity for the changes described above will become more apparent in the following detailed description of the circuit operation.

Referring again to the FIG. 3, assume all cores are in the "0" remanence state and one input variable is introduced to switch either of the cores Cx, Cy or Cz. Say the core Cx is switched from the "0" to the "1" state. The core Cx in switching induces a voltage in the output winding 18 with the undotted end positive. Coincidently, the $I_A$ clock pulse source directs a signal into the windings 60, 68 and 70 on the cores I, Co and Co', respectively, which signal tends to write the core I and read the cores Co and Co'. The core I is switched from the "0" to the "1" state and in so doing induces a voltage in the output winding 12 with the undotted end positive. The algebraic sum of the induced voltages is effectively zero and negligible current flows in the loop A. After termination of the $I_A$ clock pulse, the $I_{RA}$ clock pulse source directs a read signal into the windings 30, 32, 34 and 36 on the cores Cx, Cy, Cz and I, respectively, which resets the cores Cx and I from the "1" toward the "0" state. The cores Cx and I in being reset induce a voltage in their output windings 18 and 12, respectively, with the dotted end positive. Again, the algebraic sum of the induced voltages is effectively zero and negligible currents flows in the loop A. Thereafter, the $I_B$ clock pulse source directs a read signal into the windings 50' and 66 on the cores S and I which has no effect since both cores are already in the "0" state. Subsequently, the $I_{RB}$ clock pulse source directs a read signal into the windings 52, 54, 56 and 58 on the cores I, S, Co and Co', respectively, which has no effect since all cores are in the "0" state. Thus, when any one of the input variables is present, the circuit provides an absence of an output indication and all cores are left in the "0" state, readying the circuit for the next cycle of operation.

Assume, that in the next cycle of operation, any two of the input variables are present, which switch, say the cores Cx and Cy, from the "0" to the "1" state. The cores Cx and Cy in switching induct a voltage in the output windings 18 and 16, respectively, with the undotted end positive. Coincidently, the $I_A$ clock pulse source directs a signal into the windings 60, 68 and 70 on the cores I, Co and Co', respectively, which signal tends to write the core I and read the cores Co and Co'. The core I switches from the "0" to the "1" state and in so doing induces a voltage in the output winding 12 with the undotted end positive. The algebraic sum of the induced voltages is such as to cause a counter-clockwise current in loop A which tends to write the cores S, Co and Co', while tending to read the core Cz. The current in loop A is insufficient to overcome the constant bias applied to the core S by the source 64 which energizes the winding 62 which biases the core S toward the "0" state. Since the core Cz is already in the "0" state and the cores Co and Co' are held in the "0" by the $I_A$ drive in their windings 68 and 70, this current has no effect and its energy is dissipated in the resistor R. After termination of the $I_A$ clock pulse, the $I_{RA}$ clock pulse source directs a signal into the windings 30, 32, 34, 36 and 38 on the cores Cx, Cy, Cz, I and S, respectively, which signal tends to read the cores Cx, Cy, Cz and I and pulse biases the core S to the write "1" threshold. The cores Cx, Cy and I are reset from the "1" to the "0" state and in so doing induce a voltage in their output windings 18, 16 and 12, respectively, with the dotted end positive. The algebraic sum of the induced voltages is such as to cause a clockwise current in the loop A tending to read the cores Co, Co' and S and to write the core Cz. Since the cores Co, Co′ and S are in the "0" state and the core Cz is held in the "0" state by the $I_{RA}$ drive in the winding 34, the current has no effect and its energy is dissipated in the resistor R. At the termination of the $I_A$ and $I_{RA}$ clock pulses the core S is left in the "0" state similar to the previous cycle of operation wherein only one input variable was introduced. Further operation of the $I_B$ and $I_{RB}$ clock pulse sources provide signals as previously described above, in that all cores are left in the "0" state and no information is transferred, since the core S is left previous to the operation of the $I_B$ clock pulse source in the "0" state. Thus, when any two input variables are introduced there is no output indication and all cores are left in the "0" state, readying the circuit for the next cycle of operation.

Assume, an absence of input to the circuit. The $I_A$ clock pulse source directs a signal into the windings 60, 68, and 70 on the cores I, Co and Co′, respectively, which signal tends to write the core I and read the cores Co and Co′. The core I is switched from the "0" to the "1" state and in so doing induces a voltage in the output winding 12 with the undotted end positive causing a clockwise current in loop A which tends to write the cores Cz, Cy and Cx while tending to read the cores Co, Co′ and S. The cores Co, Co′ and S are in the "0" state and therefore are uneffected, while each of the cores Cz, Cy and Cx are partially switched toward the "1" state. The $I_{RA}$ clock pulse source, after termination of the $I_A$ clock pulse, directs a signal into the windings 30, 32, 34, 36 and 38 on the cores Cx, Cy, Cz, and I and S which signal tends to read the cores Cx, Cy, Cz and I while pulse biasing the core S toward the write "1" threshold. The cores Cx, Cy, Cz and I are reset to the "0" state to induce a voltage in their output winding 18, 16, 14 and 12, respectively, with their dotted end positive. The algebraic sum of the induced voltages is effectively zero and negligible current flows in the loop A. At the termination of the $I_A$ and $I_{RA}$ clock pulses, the core S is left in the "0" state and, as described above, further operation of the $I_B$ and $I_{RB}$ clock pulse sources will have no further effect. Thus, in the absence of any input variable there is no output indication and all the cores are left in the "0" state readying the circuit for the next cycle of operation.

Assume, in the next cycle of operation, all three input variables are introduced to energize the input windings 24, 26 and 28 on the cores Cx, Cy and Cz, respectively. The cores Cx, Cy and Cz are switched from the "0" toward the "1" state and in so doing induce a voltage in the output winding 18, 16 and 14, respectively, with the undotted end positive. Coincidentally, the $I_A$ clock pulse source directs a signal into the windings 60, 68, and 70 on the cores I, Co and Co′, respectively, which signal tends to write the core I and read the cores Co and Co′. The core I is switched from the "0" to the "1" state to induce a voltage in the output winding 12 with the undotted end positive. The algebraic sum of the induced voltages is such as to cause a counter-clockwise current in loop A which tends to write each of the cores S, Co and Co′. This current is sufficient to overcome the inhibiting bias applied by the source 64 to the winding 62 on the core S and switches the core S from the "0" to the "1" state. The cores Co and Co′ remain in the "0" state by virtue of the $I_A$ drive in the windings 68 and 70, respectively. The $I_{RA}$ clock pulse source, after temination of the $I_A$ clock pulse, directs a signal into the windings 30, 32, 34 and 36 and 38 on the cores Cx, Cy, Cz, I and S, respectively, which signal tends to read the cores Cx, Cy, Cz and I and to pulse bias the core S to the write "1" threshold. The core Cx, Cy, Cz and I are reset to the "0" state to induce a voltage in the output windings 18, 16, 14 and 12, respectively, with their dotted end positive. The algebraic sum of the induced voltages is such as to cause a clockwise current in the loop A which tends to read each of the cores Co, Co′ and S. Since the core Co and Co′ are in the "0" state, and the core S is biased by the $I_{RA}$ drive in the winding 38, the cores are uneffected and the current energy is dissipated in the resistor R. Thereafter, the $I_B$ clock pulse source directs a read signal into the windings 66 and 50′ on the cores I and S, respectively, which resets the core S from the "1" to the "0" state. The core S in switching induces a voltage in the control winding 10 with the dotted end positive to cause a counter-clockwise current in the loop A which tends to write the cores Co′, Co and I and tending to read the cores Cx, Cy and Cz. Since the cores Cx, Cy and Cz are in the "0" state while the core I is held in the "0" state by the $I_B$ drive in the winding 66, only the cores Co and Co′ are switched from the "0" to the "1" state. The cores Co and Co′ in switching induce a voltage on their respective output windings 63 and 65 to provide an output signal to further logical circuitry connected to the aforesaid output windings. Subsequently, the $I_{RB}$ clock pulse source directs a read signal into the windings 52, 54, 56 and 58 on the cores I, S, Co and Co′, respectively. The cores Co and Co′ are reset to the "0" state to induce a voltage in the input windings 20′ and 22′, respectively, with the dotted end positive. The induced voltages cause a counter-clockwise current in the loop A, which tends to read the cores Cx, Cy and Cz while tending to write the cores I and S. Since the cores Cx, Cy and Cz are in the "0" state, while the cores I and S are held in the "0" state by the $I_{RB}$ drive in their windings 52 and 54, respectively, no change takes place and the current energy is dissipated in the resistor R. Thus, when all three input variables are introduced, an output is provided and all cores are returned to the "0" state. The function of AND is then performed by operation of the circuit as described above.

It may be pointed out that the inhibit and coupling cores may be of square loop type material like the storage cores and in such instances a bias current may be provided to a further winding inductively associated with each of them individually which biases the cores toward their positive threshold (write "1" direction) in speeding up the operation of the circuit, except the storage core which is biased toward its negative threshold (read "0" direction) to allow the control herein disclosed.

In the interest of providing a complete disclosure, details of one embodiment of the NOT AND device and the AND device wherein ferrite cores are employed is given below, however, it is to be understood that other component values and current magnitudes may be employed with satisfactory operation attained so that the values given should not be considered limiting.

With the clock pulse currents $I_A$ and $I_B$ delivering a constant current of 1.0 ampere, the winding 68 and 70 may comprise one turn, the winding 66 may comprise two turns, the winding 60 may comprise three turns, the windings 44, 46, and 48 may comprise five turns and the windings 50 and 50′ may comprise ten turns. With the clock pulse currents $I_{RA}$ and $I_{RB}$ delivering a constant current of 0.5 ampere, the windings 38, 40 and 42 may comprise two turns, the windings 30, 32, 34, 36, 52, 56 and 58 may comprise five turns and the winding 54 may comprise ten turns. With the direct current bias source 64 delivering a constant current of 0.25 ampere, the winding 62 may comprise two turns. In the coupling circuits interconnecting the storage, inhibit and coupling cores, the windings 14, 16 and 18 may comprise twelve turns, the windings 20, 20′, 22 and 22′ may comprise four turns, the winding 10 may comprise ten turns and the winding 12 may comprise fifteen turns with the resistor R of 8 ohms and the input windings 24, 26 and 28 comprising four turns.

In this particular embodiment the direct current bias source 64 delivering 0.25 ampere may be applied to a two turn winding on each of the remaining cores to speed up the operation of the circuit. Each of the storage, inhibit and coupling cores may comprise toroids of magnesium-manganese ferrite composition having an outside diameter of 0.100 inch, inside diameter of 0.070 inch and thickness of 0.120 inch. This thickness may be obtained by stacking four cores each of 0.030 inch thickness and winding the stack as a single core unit.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a binary information handling system, a "NOT AND" circuit comprising a storage magnetic core; control winding means on said storage core; a first, a second, and a third input coupling core; a first and a second output coupling core; input and output winding means on each of said coupling cores; an inhibit core; output winding means on said inhibit core; circuit means including a resistor series connecting the output winding means on each of said input coupling cores with the output winding means on said inhibit core and the control winding means on said storage core and said input winding means on each of said first and second output coupling cores; a first, a second, a third and a fourth clock pulse source adapted to deliver a series of pulses in sequence displaced in time; winding means on each of said input coupling cores, on each of said output coupling cores, on said storage core and said inhibit core connected with said first clock pulse source so as to cause each of said input coupling cores, said output coupling cores, and said inhibit core to shift to a datum residual state and said storage core to be biased toward an opposite residual state when energized; further winding means on each of said input coupling cores and said storage core connected with said second clock pulse source so as to cause each of said input coupling cores to shift to the datum residual state and said storage core to shift to the opposite residual state when energized; additional shift winding means on each of said output coupling cores, said inhibit core and said storage core connected with said third clock pulse so as to cause each of said output coupling cores, said inhibit core and said storage core to shift to the datum residual state when energized; winding means on said inhibit core connected with said fourth clock pulse source so as to cause said inhibit core to shift to the opposite residual state when energized; and means for biasing said storage core toward the datum residual state.

2. A magnetic core "NOT AND" circuit comprising a storage magnetic core; control winding means on said storage core; a first, a second and a third input coupling core; a first and a second output coupling core; input and output winding means on each of said coupling cores; an inhibit core; output winding means on said inhibit core; circuit means connecting the output winding means on each of said input coupling cores with the output winding means on said inhibit core and the control winding means on said storage core and the input winding means on said output coupling cores; a first group of winding means on each of said input coupling cores, each of said output coupling cores, said inhibit core and said storage core adapted to be energized simultaneously and to drive each of said input coupling cores, said output coupling cores and said inhibit core toward a datum residual state and to bias said storage core toward an opposite residual state; a second group of winding means on each of said input coupling cores and said storage core adapted to be energized simultaneously and to drive each of said input coupling cores toward the datum residual state and said storage core toward the opposite residual state; a third group of winding means on each of said output coupling cores, said inhibit core and said storage core adapted to be energized simultaneously and to drive each of said output coupling cores, said inhibit core and said storage core toward the datum residual state; winding means on said inhibit core adapted to drive said inhibit core toward the opposite residual state when energized; and means for biasing said storage core toward the datum residual state.

3. A magnetic core "NOT AND" circuit comprising a storage magnetic core; control winding means on said storage core; an inhibit core; output winding means on said inhibit core; a first, a second and a third input coupling core; a first and a second output coupling core; input and output winding means on each of said coupling cores; circuit means connecting the output winding means on each of said input coupling cores with the output winding means on said inhibit core and the control winding means on said storage core and the input winding means on each of said output coupling cores; a first set of winding means on said first input coupling core series connected with winding means on each of said second and third input coupling cores, winding means on said inhibit core, winding means on said storage core and winding means on each of said output coupling cores adapted to drive each of the input coupling cores, each of the output coupling cores and the inhibit core toward a datum residual state and to bias said storage core toward an opposite residual state when energized from a first clock pulse source; a second set of winding means on said first input coupling core series connected with winding means on said second and third input coupling cores and winding means on said storage core adapted to drive each of said input coupling cores to the datum residual state and said storage core to the opposite residual state when energized from a second clock pulse source; a third set of winding means on said first output coupling core series connected with winding means on said second output coupling core and winding means on each of said inhibit and storage cores adapted to drive said first and second output coupling cores, said storage core and said inhibit core to the datum residual state when energized from a third clock pulse source; a fourth set of winding means on said inhibit coupling core adapted to drive said inhibit coupling core to the datum residual state when energized from a fourth clock pulse source; and means for biasing said input coupling cores and said output cores toward the opposite residual state and said storage core toward the datum residual state.

4. A circuit as described in claim 3 including means for energizing said first, second, third and fourth set of winding means including first, said second, third and fourth clock pulse source wherein said sources are the order named.

5. A magnetic core "NOT AND" circuit comprising a storage magnetic core; control winding means on said storage core; an inhibit core; output winding means on said inhibit core; a first, a second, and a third input coupling core; a first and a second output coupling core; input and output winding means on each of said coupling cores; circuit means including a resistor series connecting the output windings on each of said input coupling cores with the output winding means on said inhibit core and the control winding means on said storage core and the input winding means on each of the output coupling cores; a first set of winding means on each of said input coupling cores, said output coupling cores, said inhibit core and said storage core serially connected with one another and adapted to drive each of said input coupling cores, said output coupling cores and said inhibit core toward a datum residual state and to bias said storage core toward an opposite residual state when energized from a first clock pulse source; a second set of winding means on each of said input coupling cores and said storage core serially connected with one another and adapted to drive each of said input coupling cores toward the datum residual state and said storage core to the opposite residual state when energized from a second clock pulse source; a third set of winding means on each of said output coupling cores, said storage core and said inhibit core serially connected with one another and adapted to drive each of said output coupling cores and said inhibit core and said storage core toward the datum residual state when energized from a third clock pulse source; a fourth set of winding means on said inhibit core adapted to drive said inhibit core toward the oppoite residual state when energized from a fourth clock pulse source; and means for biasing said input coupling cores and said output coupling cores toward the opposite residual state and said storage core toward the datum residual state.

References Cited in the file of this patent

UNITED STATES PATENTS

| | | |
|---|---|---|
| 2,666,151 | Rajchman | Jan. 12, 1954 |
| 2,709,757 | Triest | May 31, 1955 |
| 2,723,353 | Spitzer | Nov. 8, 1955 |
| 2,742,632 | Whitely | Apr. 17, 1956 |
| 2,781,504 | Canepa | Feb. 12, 1957 |
| 2,974,310 | Russell | Mar. 7, 1961 |

UNITED STATES PATENT OFFICE

CERTIFICATE OF CORRECTION

Patent No. 3,070,706 December 25, 1962

Erich Bloch et al.

It is hereby certified that error appears in the above numbered patent requiring correction and that the said Letters Patent should read as corrected below.

Column 6, line 61, for "Cz", first occurrence, read -- Cx --; column 7, line 3, for "Cx", second occurrence, read -- Cz --; column 8, line 47, for "induct" read -- induce --; column 12, line 48, for "first, said second" read -- said first second --; line 49, for "source" read -- sources --; same line 49, strike out "the"; line 50, before "order" insert -- actuated in the --.

Signed and sealed this 17th day of September 1963.

(SEAL)
Attest:

ERNEST W. SWIDER
Attesting Officer

DAVID L. LADD
Commissioner of Patents